S. J. SPEICHER.
DUST VALVE.
APPLICATION FILED DEC. 20, 1918.
1,339,005.
Patented May 4, 1920.
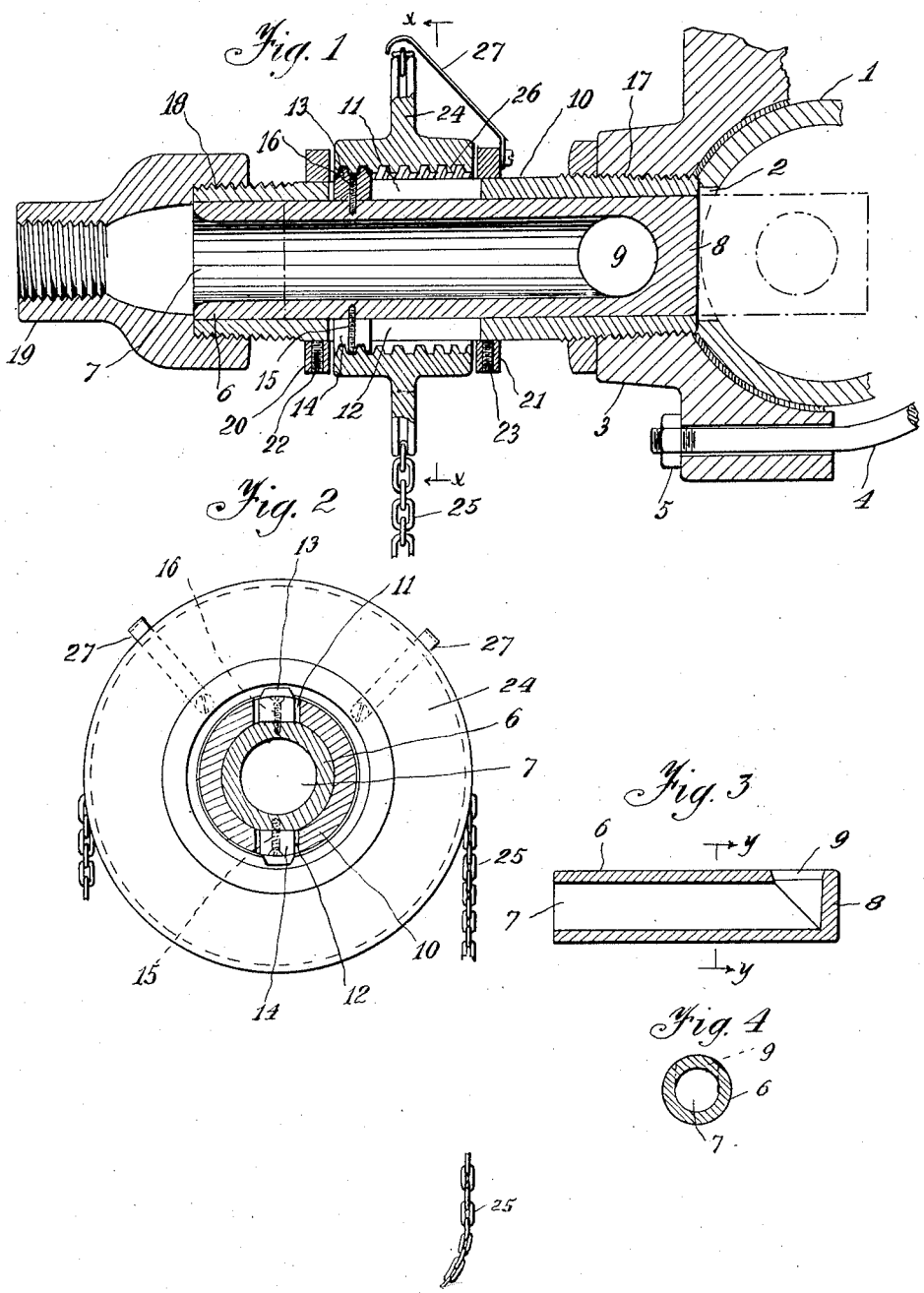

UNITED STATES PATENT OFFICE.

SAMUEL J. SPEICHER, OF PITTSBURGH, PENNSYLVANIA.

DUST-VALVE.

1,339,005.  Specification of Letters Patent.  Patented May 4, 1920.

Application filed December 20, 1918. Serial No. 267,611.

*To all whom it may concern:*

Be it known that I, SAMUEL J. SPEICHER, a citizen of the United States, residing at Pittsburgh, in the county of Allegheny and State of Pennsylvania, have invented certain new and useful Improvements in Dust-Valves, of which the following is a specification.

This invention relates to new and useful improvements in dust valves and has for its primary object to provide a device of the character herein described which will remove dust or foreign accumulations from pipe lines.

Other objects of this invention are to provide a valve of the type specified which cannot clog up when not in use, and which will assure a steady pressure or flow even if only partly open.

Still further objects of this invention are to provide a dust valve of the class set forth which is simple in its construction and arrangement, strong, durable and efficient in its use and inexpensive to manufacture.

In the drawing forming a portion of this specification and wherein like numerals of reference designate corresponding parts throughout the several views:

Figure 1 is a longitudinal sectional view of the dust valve attached to a pipe and embodying the invention.

Fig. 2 is a view on line $x$—$x$, Fig. 1.

Fig. 3 is a longitudinal sectional view of the valve member.

Fig. 4 is a view on line $y$—$y$, Fig. 3.

Referring more in detail to the drawing there is shown in Fig. 1 a dust valve, embodying the invention, attached to the pipe 1, having an opening 2, by means of the ordinarily constructed saddle 3, U-bolt 4 and the nuts 5.

The valve member 6 consists of a tube open at the end 7 and closed at the end 8. A right angularly disposed opening 9 is formed in the valve member 6 adjacent the closed end 8 thereof.

The valve member 6 is slidably mounted, for horizontal movement, in the valve casing 10, which is provided with the oppositely disposed slots 11 and 12 in which the rack bars 13 and 14, secured to the valve member 6 by the screws 15 and 16, are respectively mounted.

The valve casing 10 has a threaded connection 17 in the saddle 3 and registers with the opening 2 in the pipe 1. The other end 18, of the valve casing 10 is provided with the fitting 19 for the attachment of the feed or air line.

Spacing collars 20 and 21, secured by the screws 22 and 23, respectively, are mounted on the valve casing 10, one on each side of the slots 11 and 12. Intermediate of the spacing collars 20 and 22, on the valve casing 10, is the rag wheel nut 24 which meshes with the rack bars 13 and 14.

The rag wheel nut 24 is rotated by means of the manually operated chain 25 which engages the teeth 26 on the rag wheel nut 24, and to prevent the chain 25 from becoming disengaged therefrom a plurality of guards 27, carried by the spacing collars 20 and 21, are provided.

It will be noted that the improved dust valve is primarily designed for pipe lines conveying pulverized coal, and is attached to the pipe line in a horizontal position. The rotation, in one direction, of the rag wheel nut 24, in mesh with the rack bars 13 and 14, will cause the valve member 6 to move through the opening 2 into the pipe 1 and permit a strong blast of air to be blown therein through the opening 9 in the valve member 6, thereby removing all foreign accumulation therefrom. The reverse direction of rotation of the rag wheel nut 24 will again close the valve.

From the foregoing description taken in connection with the accompanying drawing, the advantages of the construction and the method of operation will be readily apparent to those skilled in the art to which the invention appertains, and while describing the principle of operation of the invention together with the device which is now considered to be the best embodiment thereof, it is to be understood that the device shown is merely illustrative and that various changes in the form, proportion and the minor details of construction may be resorted to without departing from the principle or sacrificing any of the advantages of the invention as defined in the appended claims.

What I claim as new and desire to secure by Letters Patent is:

1. In combination, a pipe line, a valve casing open at both ends and in direct communication at one end with said pipe line, an air line communicating with the other end of said casing, a tubular valve slidable in the casing and having its end adjacent to the air line open, the other end of the valve being closed, said valve being provided adjacent to its closed end with an opening directed substantially parallel to the pipe line, and means for projecting the closed end portion of the valve into and withdrawing it from said pipe line, said means holding the valve against rotary movement so as to maintain the outlet opening thereof in substantial parallelism with the pipe line.

2. In combination, a pipe line, a valve casing open at both ends and in direct communication at one end with said pipe line, an air line communicating with the other end of said casing, a tubular valve slidable in the casing and having its end adjacent to the air line open, the other end of the valve being closed, said valve being provided adjacent to its closed end with an opening directed substantially parallel to the pipe line, and means for projecting the valve into and withdrawing it from the pipe line, said means also acting to lock the valve in adjustment.

3. In combination, a pipe line, a valve casing open at both ends and in direct communication at one end with said pipe line, an air line communicating with the other end of said casing, a tubular valve slidable in the casing and having its end adjacent to the air line open, the other end of the valve being closed, said valve being provided adjacent to its closed end with an opening directed substantially parallel to the pipe line, and means for projecting the valve into and withdrawing it from the pipe line and for holding the valve against rotary movement, said means also acting to lock the valve in adjustment.

4. In combination, a pipe line, a cylindrical valve casing open at both ends and in direct communication at one end with said pipe line, the casing being provided with two slots extending longitudinally thereof, an air line communicating with the other end of the casing, a tubular valve slidable in the casing and having its end adjacent to the air line open, the other end of the valve being closed, said valve being provided adjacent to its closed end with an outlet opening directed substantially parallel to the pipe line, rack members secured to the valve and projecting through said slots and slidable therein, and a member mounted on the casing and rotatable about the same, said member being held against axial movement and having a thread meshing with said rack members for adjusting the valve in either direction within the casing.

In testimony whereof I affix my signature.

SAMUEL J. SPEICHER.